US007695205B2

(12) United States Patent
Kim et al.

(10) Patent No.: US 7,695,205 B2
(45) Date of Patent: Apr. 13, 2010

(54) DRIVING APPARATUS AND IMAGE FORMING DEVICE HAVING THE SAME

(75) Inventors: Hyun-il Kim, Incheon (KR); Kyung-pyo Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 375 days.

(21) Appl. No.: 11/708,014

(22) Filed: Feb. 20, 2007

(65) Prior Publication Data

US 2007/0240594 A1 Oct. 18, 2007

(30) Foreign Application Priority Data

Apr. 18, 2006 (KR) ..................... 10-2006-0034862

(51) Int. Cl.
*B41J 13/00* (2006.01)
*F16H 1/28* (2006.01)
*B41J 33/22* (2006.01)

(52) U.S. Cl. .................... 400/636.2; 400/236.2; 74/422

(58) Field of Classification Search ................. 400/186, 400/236.2, 578, 624, 625, 636, 637, 639, 400/636.2, 156.2; 74/354, 406, 422, 405; *B41J 13/054, B41J 13/048, 13/042, 13/036, 13/03, 33/22; F16H 1/28*
See application file for complete search history.

(56) References Cited

U.S. PATENT DOCUMENTS 5,009,532 A * 4/1991 Akazawa et al. ......... 400/636.2
5,069,557 A * 12/1991 Kuzuya et al. ......... 400/120.18
5,896,774 A * 4/1999 Funahashi et al. ............. 74/353
2004/0032074 A1* 2/2004 Park .......................... 271/4.01
2004/0207708 A1* 10/2004 Ohashi et al. ............... 347/104

FOREIGN PATENT DOCUMENTS

| | | |
|---|---|---|
| JP | 63-123730 | 5/1988 |
| JP | 05185668 A * | 7/1993 |
| JP | 2001-1588 | 1/2001 |
| JP | 2004-74784 | 3/2004 |
| KR | 1993-3004 | 2/1992 |
| KR | 10-318740 | 12/2001 |

OTHER PUBLICATIONS

JPO Machine Translation of JP 05185668 A.*
Korean Office Action dated Mar. 26, 2007 issued in KR 2006-34862.

* cited by examiner

*Primary Examiner*—Judy Nguyen
*Assistant Examiner*—Jennifer Simmons
(74) *Attorney, Agent, or Firm*—Stanzione & Kim, LLP

(57) ABSTRACT

A driving apparatus includes a driving gear bidirectionally rotatable by a driving source, at least two driven gears selectively driven by the driving gear, at least two swing gears connected to the driving gear to operate in combination with the driving gear and to transmit a driving force of the driving gear to the driven gears, a swing lever pivotally disposed to support the swing gears, and an adjusting unit to adjust a swing position of the swing lever.

23 Claims, 5 Drawing Sheets

DRIVING APPARATUS AND IMAGE FORMING DEVICE HAVING THE SAME

CROSS-REFERENCE TO RELATED APPLICATIONS

This application claims priority under 35 U.S.C. § 119(a) from Korean Patent Application No. 10-2006-34862, filed on Apr. 18, 2006, in the Korean Intellectual Property Office, the entire content of which is incorporated herein by reference.

BACKGROUND OF THE INVENTION

1. Field of the Invention

The present general inventive concept relates to a driving apparatus and an image forming device having the same.

2. Description of the Related Art

A thermal transfer image forming device is a well-known type of image forming device which is able to form an enhanced quality image and extend the preservation lifespan of the formed image. The thermal transfer image forming device usually forms an image of high definition, such as a photograph, onto a recording medium, such as a recording paper.

The thermal transfer image forming device generally includes a pickup and discharging roller to pick up and discharge the recording medium, a conveying roller to reciprocally convey the picked-up recording medium, an image forming unit to form a desired image on the picked-up recording medium, a supplying roller and a winding roller to drive an ink ribbon on which a plurality of color dyes are applied, and a conventional driving apparatus to drive the components described above to operate in combination with one another. The image forming unit is provided with a thermal transfer head to transfer the color dyes applied on the ink ribbon onto the recording medium.

In operation, the recording medium is picked up through the pickup and discharging roller and is conveyed to the image forming unit by the conveying roller. The thermal transfer head of the image forming unit thermally transfers the color dyes on the ink ribbon onto the recording medium to form the desired image while the ink ribbon is conveyed by winding on the winding roller and the recording medium is conveyed by the conveying roller in the same direction as that of a conveying direction of the ink ribbon.

To operate the conveying roller, the winding roller, the pickup and discharging roller, and the thermal transfer head in combination with one another as described above, the conventional driving apparatus of the thermal transfer image forming device is configured to include a plurality of gears, a cam unit, various swing lever units, etc., thereby including a complicated power transmitting structure.

Accordingly, the conventional driving apparatus is disadvantageous in that a driving force cannot be accurately and smoothly transmitted since the conventional driving apparatus includes the complicated power transmitting structure.

Further, because of the complicated power transmitting structure, the conventional driving apparatus occupies a large space in the thermal transfer image forming device, thereby imposing restrictions on a miniaturization of the image forming device.

Also, because of the complicated power transmitting structure, the conventional driving apparatus requires high precision measurements for the gears, the cam unit, the swing lever units, etc., thereby increasing fabrication costs.

SUMMARY OF THE INVENTION

The present general inventive concept provides a driving apparatus able to more accurately and smoothly transmit a driving force, and an image forming device having the same.

The present general inventive concept also provides a driving apparatus that has a more simplified structure, and an image forming device having the same.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a driving apparatus including a driving gear bidirectionally rotatable by a driving source, at least two driven gears selectively driven by the driving gear, at least two swing gears connected to the driving gear to drive corresponding ones of the at least two driven gears, a swing lever pivotally disposed to support the at least two swing gears, and an adjusting unit to adjust a swing position of the swing lever.

The adjusting unit may include a rack member coupled to a side of the swing lever to linearly move and to swing the swing lever.

The rack member may include a guide slot having a plurality of steps, each step having a different height with respect to a reference, and the swing lever may include a guide protrusion projected from the side of the swing lever to be guided by the guide slot.

A number of the plurality of steps may be one more than a number of the at least two driven gears.

The at least two driven gears may be rotated only in one direction.

The apparatus may further include a clutch unit disposed between at least one of the at least two driven gears and at least one of the at least two swing gears to regulate the at least one of the at least two driven gears to rotate only in one direction.

The clutch unit may include an input gear bidirectionally rotatable by the at least one of the at least two swing gears, a first clutch part to transmit a driving force from the input gear and to change the rotating direction of the driving force to the at least one of the at least two driven gears, and a second clutch part to transmit the driving force from the input gear without changing the rotating direction to the at least one of the at least two driven gears.

The at least two driven gears may include first and second driven gears, the at least two swing gears may include first and second swing gears, and the swing position of the swing lever adjusted by the adjusting unit may include a first position to engage the second swing gear with the clutch unit, a second position wherein the first swing gear and the second swing gear are not engaged to the first driven gear and the clutch unit, respectively, and a third position to engage the first swing gear to the first driven gear.

The adjusting unit may include a guide slot having first, second, and third steps corresponding to the respective first, second, and third positions.

A reciprocal linear movement of the adjusting unit may move the guide protrusion between the first, second, or third step to swing the swing lever between the first, second, and third position, respectively.

The foregoing and/or other aspects and utilities of the present general inventive concept may also be achieved by providing an image forming apparatus including a supplying roller and a winding roller on which an ink ribbon is wound, a conveying roller to convey a recording medium, a pickup roller to pick up the recording medium, a thermal transfer head to thermally transfer dyes on the ink ribbon onto the recording medium, and a driving apparatus including a driving gear bidirectionally rotatable and connected to the conveying roller, a first driven gear connected to the winding roller, a second driven gear connected to the pickup roller, a first swing gear and a second swing gear connected to the driving gear and to drive the first and second driven gears, respectively, a swing lever pivotally to support the first and the second swing gears, and an adjusting unit to adjust a swing position of the swing lever.

The adjusting unit may include a rack member coupled to a side of the swing lever to linearly move and to swing the swing lever.

The image forming device may further include a clutch unit disposed between the second driven gear and the second swing gear to regulate the second driven gear to rotate only in one direction.

The swing position of the swing lever adjusted by the adjusting unit may include a first position to engage the second swing gear with the clutch unit, a second position wherein the first swing gear and the second swing gear are not engaged to the first driven gear and the clutch unit, respectively, and a third position to engage the first swing gear to the first driven gear.

The adjusting unit may include a guide slot having first, second, and third steps corresponding to the respective first, second, and third positions.

The foregoing and/or other aspects and utilities of the present general inventive concept may also be achieved by providing a driving apparatus usable in an image forming apparatus, the driving apparatus including a driving gear rotatable in a first and second direction by a driving source, first and second driven gears selectively driven by the driving gear, first and second swing gears connected to the driving gear to drive the first and second driven gears, respectively, a swing lever pivotally disposed to support the first and second swing gears, a clutch unit to regulate the rotation of the second swing gear in one of the first and second direction such that the second driven gear rotates in only one of the first and second direction, and an adjusting unit to adjust a swing position of the swing lever with respect to the driving gear.

The swing position of the swing lever adjusted by the adjusting unit may include a first position to engage the second swing gear with the clutch unit, a second position wherein the first swing gear and the second swing gear are not engaged to the first driven gear and the clutch unit, respectively, and a third position to engage the first swing gear to the first driven gear.

The adjusting unit may include a guide slot having first, second, and third steps corresponding to the respective first, second, and third positions.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
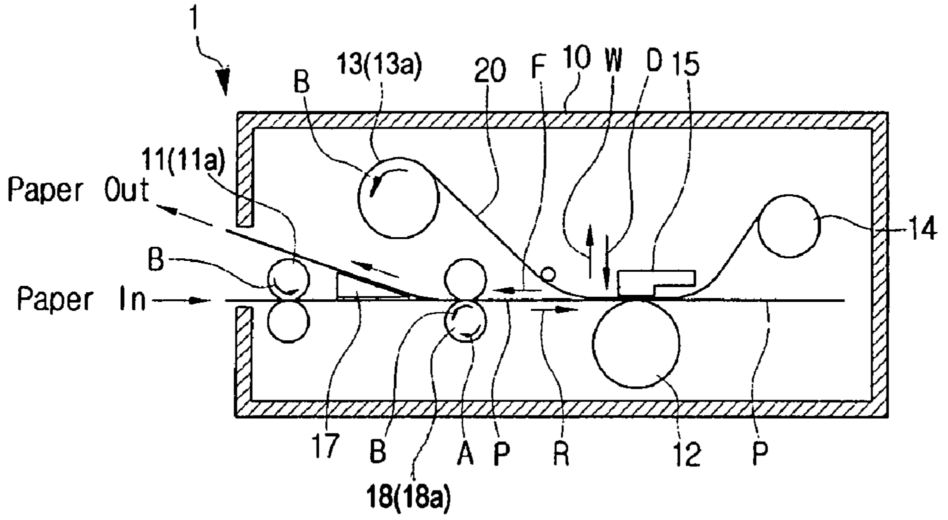
FIG. 1 is a schematic view illustrating an image forming device according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
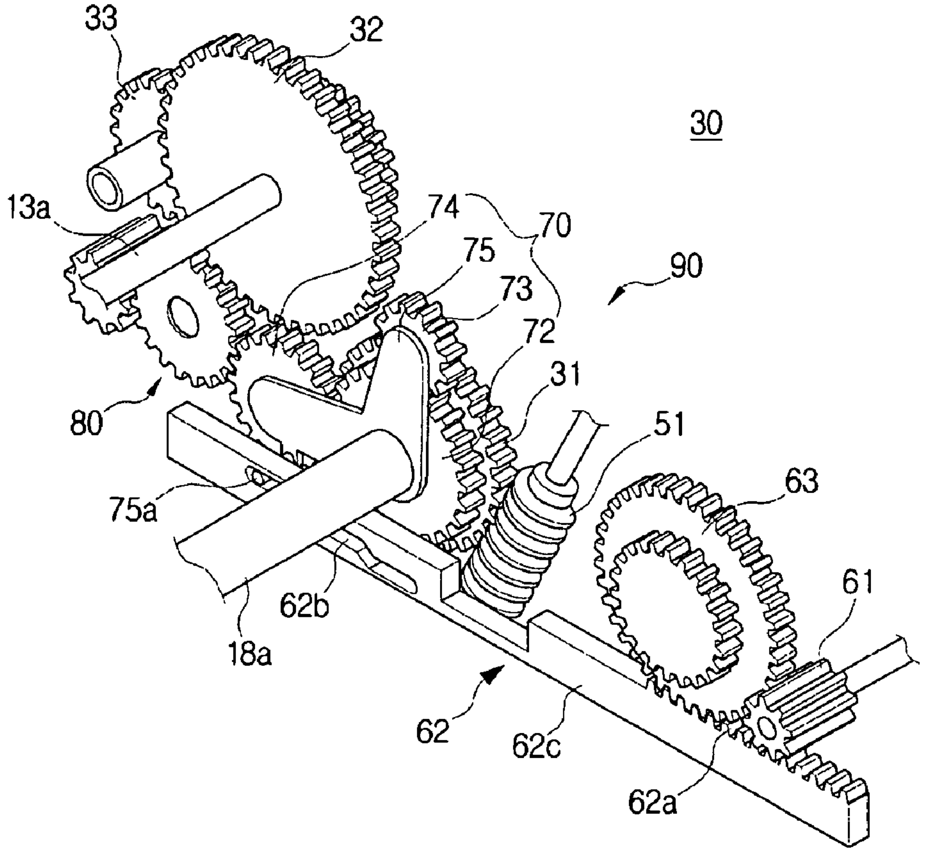
FIG. 2 is a perspective view illustrating a driving apparatus according to an embodiment of the present general inventive concept.

FIG. 2 illustrates a driving apparatus 30 according to an embodiment of the present general inventive concept.

As illustrated in FIG. 2, the driving apparatus 30 includes a driving gear 31, a first driven gear 32, and a second driven gear 33. The first and second driven gears 32 and 33 are selectively rotated by the driving gear 31.

The driving gear 31 is bidirectionally rotatable by a first driving source 50 (see FIGS. 3 through 6). A driving force of the driving gear 31 is selectively transmitted or blocked to the first and the second driven gears 32 and 33 by a power transmitting unit 90.

As illustrated in FIGS. 3 through 6, the first driving source 50 can comprise a motor, which is bidirectionally rotatable such as a stepping motor and may be coupled with an output gear 51. The output gear 51 is engaged with the driving gear 31 to transmit a driving force of the first driving source 50 to the driving gear 31.

While FIGS. 2 through 6 illustrate the driving gear 31 and the output gear 51 as a worm gear shape in which a worm wheel and a worm are engaged with each other, the present general inventive concept is not limited thereto. The driving gear 31 and the output gear 51 can be substituted by gear combinations of other shapes.

Similarly, while in the illustrated embodiment driven gears are illustrated and explained as two driven gears, i.e., the first driven gear 32 and the second driven gear 33, the present general inventive concept is not limited thereto. The driven gears can include more than two driven gears.

The power transmitting unit 90 is configured to selectively transmit or block the driving force of the driving gear 31 to the first and the second driven gears 32 and 33. The power transmitting unit 90 includes a swing gear assembly 70, an adjusting unit 62, and a clutch unit 80.

FIGS. 2 through 6 illustrate an example of the swing gear assembly 70.

As illustrated in FIGS. 2 through 6, the swing gear assembly 70 includes two swing gears 73 and 74 connected to the driving gear 31 to operate in combination therewith, and a swing lever 75 to support the swing gears 73 and 74.

While FIGS. 2 though 6 illustrate swing gears as two swing gears 73 and 74 to correspond to the driven gears 32 and 33, the present general inventive concept is not limited thereto and more swing gears may be included to correspond to the driven gears used. For example, a different number of swing gears can be used to correspond with a different number of driven gears used.

In FIGS. 2 through 6 the first swing gear 73 is selectively connected to or released from the first driven gear 32 and the second swing gear 74 is selectively connected to or released from an input gear 81 of the clutch unit 80 that engages the second driven gear 33 by a swing operation of the swing lever 75.

In addition, the swing gear assembly 70 can further include a center gear 72 interposed between the driving gear 31 and the first and the second swing gears 73 and 74. The center gear 72 is disposed at a side surface of the driving gear 31 to rotate together with the driving gear 31, so that the first and the second swing gears 73 and 74 are engaged with an outer circumferential surface of the center gear 72 by the swing lever 75.

The swing lever 75 is installed to swing about a pivot point, such as a center of the driving gear 31 or the center gear 72, and support the first and the second swing gears 73 and 74 against the center gear 72. With such a swing operation of the swing lever 75, the first and second swing gear 73 and 74 are connected to or released from the first and the second driven gear 32 and 33, respectively.

The swing lever 75 is swung by the adjusting unit 62 so as to adjust the swing position thereof.

As illustrated in FIGS. 2 through 6, the adjusting unit 62 includes a rack member 62*c* to move linearly. The swing lever 75 is swung about the pivot point by the linear movement of the rack member 62*c*.

The rack member 62*c* has a tooth part 62*a* formed of a certain length at one end thereof, and a guide groove or slot 62*b* formed at the other end side thereof.

The tooth part 62*a* of the rack member 62*c* is engaged with an output gear 61 of a second driving source 60, so that the rack member 62*c* is linearly reciprocated by a driving force of the second driving source 60.

Figure 10:
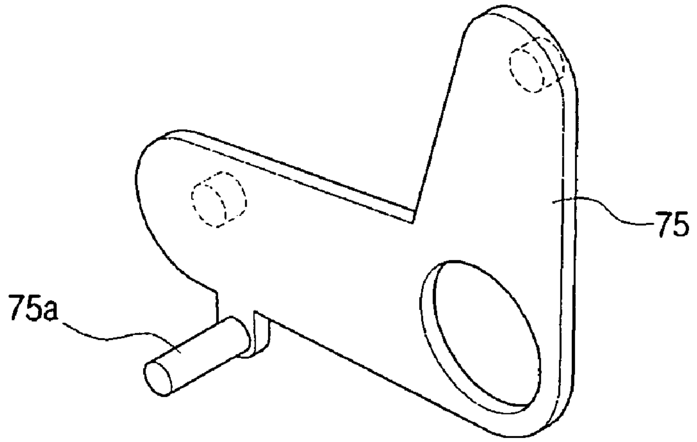
FIG. 10 is a perspective view illustrating a swing lever of the driving apparatus of FIG. 2.

Between the tooth part 62*a* of the rack member 62*c* and the output gear 61 can be interposed more than one intermediate gear 63. And, a guide protrusion 75*a* (see FIG. 10) projecting from a side of the swing lever 75 is inserted in the guide slot 62*b* of the rack member 62*c*.

The guide slot 62*b* has a plurality of steps S1, S2, and S3, each of which has a different height with respect to a reference, for example, a bottom of the adjusting unit 62, and inclined surfaces are formed between the adjacent steps S1, S2, and S3. Thus, the guide protrusion 75*a* of the swing lever 75 can easily move between the steps S1, S2, and S3 and/or maintain a displaced position at one step after moving from another in the guide slot 62*b*.

Figure 3:
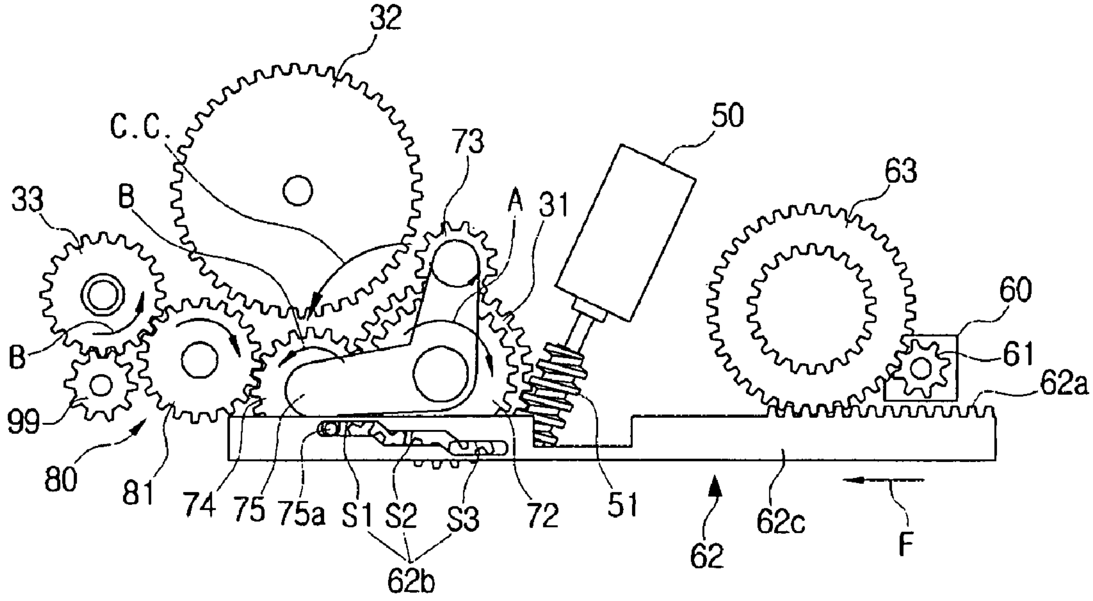
FIG. 3 is a side view illustrating the driving apparatus of FIG. 2 when a recording medium is fed.

While FIGS. 3 thought 6 illustrate the steps of the guide slot 62*b* as three steps S1, S2, and S3, the present general invention is not limited thereto. The steps of the guide slot 62*b* may be configured to have a different number of steps. For example, the guide slot 62*b* may have a number of steps equal to one more than the number of driven gears or swing gears used.

When the driving force of the second driving source 60 is transmitted to the rack member 62*c*, the rack member 62*c* is linearly reciprocated, so that the guide protrusion 75*a* is guided along the guide slot 62*b* of the rack member 62*c*. After being moved along the guide slot 62*b* of the rack member 62*c*, the guide protrusion 75*a* is maintained at a displaced position corresponding to the step S1, S2 or S3 of the guide slot 62*b*, so that the swing lever 75 connected with the guide protrusion 75*a* is swung by a difference in height between an initial step S1, S2 or S3 and a moved step S1, S2 or S3 of the guide slot 62*b* about the center of the driving gear 31, or the center gear 72, thereby adjusting the swung position of the swing lever 75.

The clutch unit 80 may be interposed between the second swing gear 74 and the second driven gear 33, so that it properly changes a rotating direction of the driving force transmitted from the second swing gear 74, thereby regulating the second driven gear 33 to rotate only in one direction.

Figure 7:
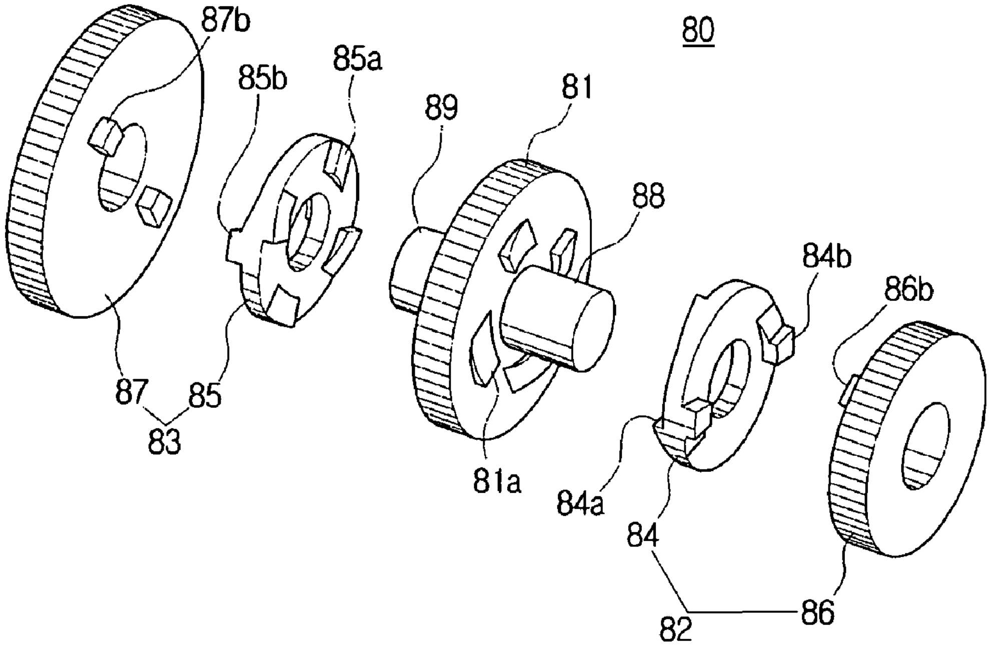
FIG. 7 is an exploded perspective view illustrating a clutch unit of FIG. 2.

FIG. 7 illustrates an example of the clutch unit 80. As illustrated in FIG. 7, the clutch unit 80 includes an input gear 81, which receives the driving force of the second swing gear 74, and a first clutch part 82 and a second clutch part 83 to regulate a rotating direction of the driving force received from the input gear 81 in one direction.

The first clutch part 82 is provided with a first clutch wheel 84 rotatably disposed on one side of a shaft 88 of the input gear 81, and a first clutch gear 86 to face and to contact the first clutch wheel 84.

The first clutch wheel 84 has a plurality of clutch protrusions 84*a* formed at a side surface thereof. The plurality of clutch protrusions 84*a* are configured, so that they are engagable with a plurality of clutch protrusions 81*a* formed at one side surface of the input gear 81, thereby transmitting a rotating force only in one direction (a direction of the arrow A of FIGS. 8 and 9) to the first clutch gear 86.

The first clutch gear 86 has a plurality of engaging protrusions 86*b* at a side surface facing the first clutch wheel 84. The plurality of engaging protrusions 86*b* are configured so that they are engagable with a plurality of engaging protrusions 84*b* formed at a side surface of the first clutch wheel 84. The first clutch gear 86 engages with the second driven gear 33.

The second clutch part 83 is provided with a second clutch wheel 85 rotatably disposed on a shaft 89 on another side of the input gear 81 and a second clutch gear 87 to face and contact the second clutch wheel 85 and engage an idle gear 99 interposed between the second clutch gear 87 and the second driven gear 33.

The second clutch wheel 85 has a plurality of clutch protrusions 85*a* formed at a side surface thereof. The plurality of clutch protrusions 85*a* are configured so that they are engagable with a plurality of clutch protrusions 81 b formed at another side surface of the input gear 81 facing the second clutch wheel 85 (see FIG. 8), thereby transmitting a rotating force only in one direction (a direction of the arrow B of FIGS. 8 and 9) to the second clutch gear 87.

The second clutch gear 87 has a plurality of engaging protrusions 87*b* at a side surface facing the second clutch wheel 85. The plurality of engaging protrusions 87*b* are configured so that they are engagable with a plurality of engaging protrusions 85*b* formed at a side surface of the second clutch wheel 85.

The idle gear 99 is configured so that it is engaged with the second clutch gear 87 and the second driven gear 33, thereby transmitting the rotating force transmitted through the second clutch gear 87, to the second driven gear 33.

Figure 8:
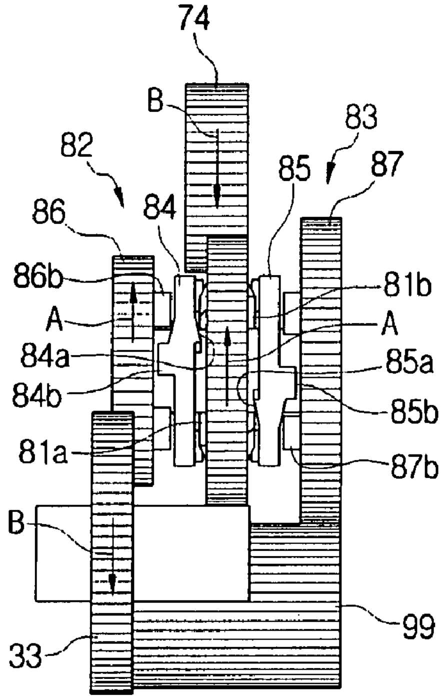
FIG. 8 is a front view illustrating one operating state of the clutch unit of FIG. 7.
Figure 9:
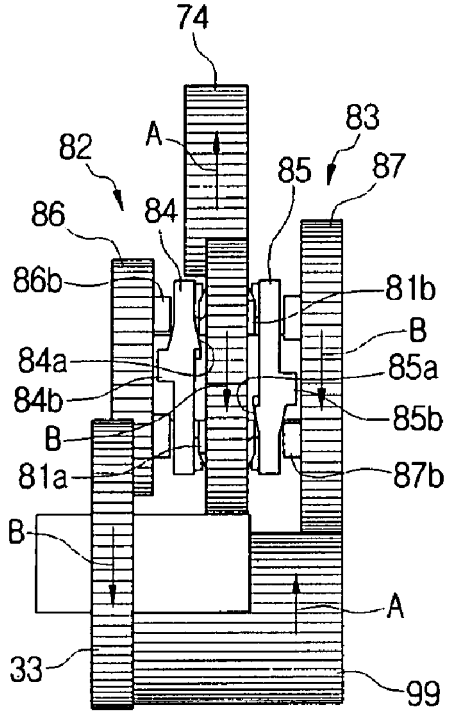
FIG. 9 is a front view illustrating another operating state of the clutch unit of FIG. 7.

As illustrated FIG. 8, when the input gear 81 is rotated in the direction of the arrow A by rotation of the second swing gear 74 in the direction of the arrow B, the first clutch wheel 84 and the first clutch gear 86 are rotated in the direction of the arrow A. Thus, the second driven gear 33 engaged with the first clutch gear 86 is rotated only in the direction of the arrow B.

When the input gear 81 is rotated in the direction of the arrow B by rotation of the second swing gear 74 in the direction of the arrow A, the second clutch wheel 85 and the second clutch gear 87 are rotated in the direction of the arrow B. Thus, the second driven gear 33 engaged with the idle roller 99 is rotated only in the direction of the arrow B.

FIG. 1 illustrates a thermal transfer image forming device 1 using the driving apparatus 30 of FIG. 1 according to an embodiment of the present general inventive concept.

As illustrated in FIG. 1, the thermal transfer image forming device includes a main body 10, an ink ribbon 20 having dyes applied thereon, a pickup and discharging roller 11 to pick up and discharge a recording medium P, such as photo printing paper, etc., a conveying roller 18 to reciprocally convey the recording medium P, a winding roller 13 and a supplying roller 14 to drive the ink ribbon 20, a thermal transfer head 15 to transfer the dyes of the ink ribbon 20 onto the recording medium P, a platen roller 12 to bring the recording medium P and the ink ribbon 20 in contact with the thermal transfer head 15, and the driving apparatus 30 of FIGS. 2 through 6 to drive the components described above. A structure 17, for example a guide or divider, may be disposed between the pickup and discharging roller 11 and the conveying roller 18 to guide the recording medium P along a feed path from the pickup and discharging roller 11 to the conveying roller 18, and to guide the recording medium P from the conveying roller 18 to an outside of the thermal transfer image forming device.

The driving gear 31 of the driving apparatus 30 is disposed to be bidirectionally rotatable, and is connected to a rotating shaft 18*a* of the conveying roller 18.

The first driven gear 32 of the driving apparatus 30 is disposed to be rotatable only in one direction, and is connected to a rotating shaft 13*a* of the winding roller 13.

The second driven gear 33 of the driving apparatus 30 is disposed to be rotatable in only one direction, and is connected to a rotating shaft 11 a of the pickup roller 11.

The first driving source 50 rotates the driving roller 31, and the second driving source 60 moves the thermal transfer head 15 up and down by using a power transmitting device (not illustrated). In addition, the second driving source 60 may be disposed to drive the adjusting unit 62.

Hereinafter, operations of the driving apparatus 30 and the thermal transfer image forming device 1 according to an embodiment of the present general inventive concept will be described in detail with reference to FIGS. 1 through 7.

Pickup Operation of Recording Medium P

As illustrated in FIG. 3, when the first driving source 50 is operated, the driving gear 31 may be rotated in a direction of an arrow A by the output gear 51. A driving force of the driving gear 31 is transmitted to the swing gear assembly 70, so that the second swing gear 74 is rotated in a direction of an arrow B. The second swing gear 74 of the swing gear assembly 70 is connected to the clutch unit 80 disposed between the second driven gear 33 and the second swing gear 74 by the swing operation of the swing lever 75. Accordingly, the clutch unit 80 rotates the second driven gear 33 in the direction of the arrow B. At this time, the guide protrusion 75*a* of the swing lever 75 is positioned at an upper step S1 of the guide slot 62*b* of the rack member 62*c*.

With a rotation of the second driven gear 33 in the direction of the arrow B, the pickup roller 11 is rotated in the direction of the arrow B illustrated in FIG. 1. As a result, a recording medium P is picked up in a direction of an arrow R illustrated in FIG. 1 by an operation of the pickup roller 11.

A this time, the second driving source 60 moves the thermal transfer head 15 in a direction of an arrow W of FIG. 1, thereby separating the thermal transfer head 15 from the ink ribbon 20 and the recording medium P.

Conveying Operation of Recording Medium P

Figure 4:
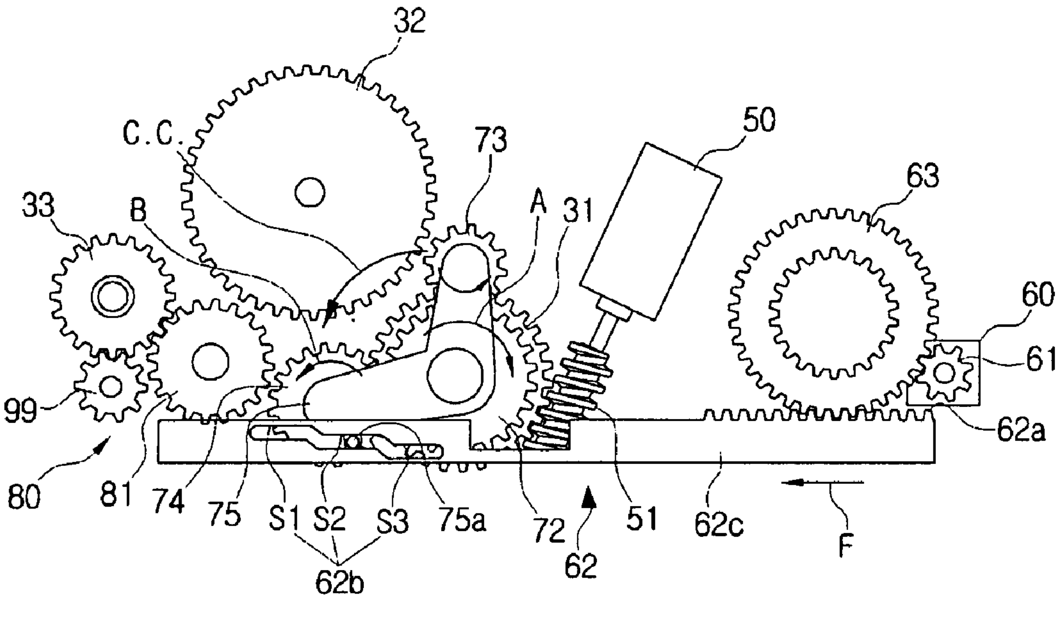
FIG. 4 is a side view illustrating the driving apparatus of FIG. 2 when a recording medium is conveyed.

When the rack member 62*c* is moved in a direction of an arrow F of FIG. 3 by the output gear 61 of the second driving source 60, the guide protrusion 75*a* of the swing lever 75 is guided along the guide slot 62*b* of the rack member 62*c*, and is positioned at an intermediate step S2 of the guide slot 62*b*, as illustrated in FIG. 4. Accordingly, the swing lever 75 is swung in a direction of an arrow C.C. of FIGS. 3 and 4, so that the first and the second swing gears 73 and 74 are separated from the first driven gear 32 and the input gear 81 of the clutch unit 80 engaged with the second driven 33, respectively, as illustrated in FIG. 4.

That is, as the first and the second swing gears 73 and 74 are separated from the first driven gears 32 and the input gear 81 of the clutch unit 80, respectively, the swing gear assembly 70 is released from both the first driven gear 32 and the second driven gear 33. In this position, when the driving gear 31 is rotated in the direction of the arrow A in FIG. 4 the conveying roller 18 rotates in the direction of the arrow A in FIG. 1, the recording medium P is conveyed in the direction of the arrow R.

Figure 5:
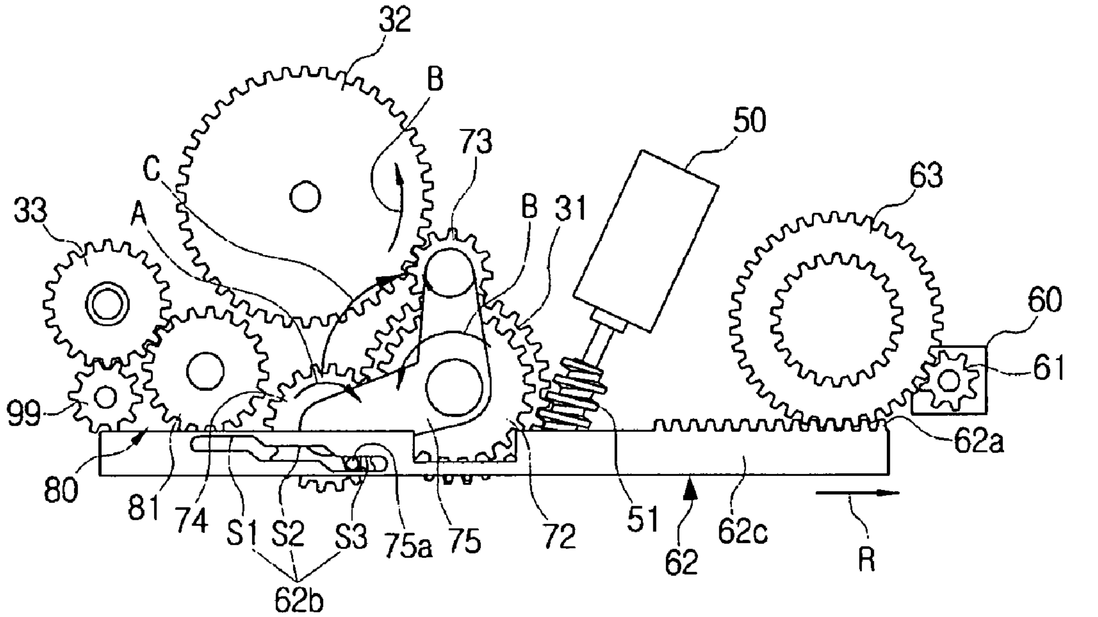
FIG. 5 is a side view illustrating the driving apparatus of FIG. 2 when a recording medium is printed.

At this time, the second driving source 60 moves the thermal transfer head 15 in a direction of an arrow D in FIG. 1, so that the thermal transfer head 15 is positioned adjacent to the ink ribbon 20 and the recording medium P Printing Operation of Recording Medium P When the rack member 62*c* is moved further along in the direction of the arrow F in FIG. 4 by the output gear 61 of the second driving source 60, the guide protrusion 75*a* of the swing lever 75 is guided along the guide slot 62*b* of the rack member 62*c*, and is positioned on a lower step S3 of the guide slot 62*b*, as illustrated in FIG. 5. As a result, the swing lever 75 is swung in the direction of the arrow C.C. of FIG. 4, so that the first swing gear 73 is engaged with the first driven gear 32, as illustrated in FIG. 5.

After the first swing gear 73 is engaged with the driven gear 32, when the driving gear 31 is rotated in the direction of the arrow B, a driving force of the driving gear 31 is transmitted to the first driven gear 32 through the first swing gear 73 to rotate the first driven gear 32 in the direction of the arrow B. As a result, the winding roller 13 is rotated in the direction of the arrow B, so that the ink ribbon 20 is wound on the winding roller 13 from the supply roller 14.

At the same time, the second driving source 60 further moves the thermal transfer head 15 in the direction of the arrow D in FIG. 1 to bring the thermal transfer head 15 in contact with the ink ribbon 20 and the recording medium P.

With such an operation of the first driven gear 32 and the driving gear 31, the recording medium P is conveyed in the direction of the arrow F and the ink ribbon 20 is transferred in the direction of the arrow B as illustrated in FIG. 1, and the thermal transfer head 15 transfers dyes of the ink ribbon 20 onto the recording medium P to carry out a printing operation, while contacting the ink ribbon 20 and the recording medium P.

Discharging Operation of Recording Medium P

Figure 6:
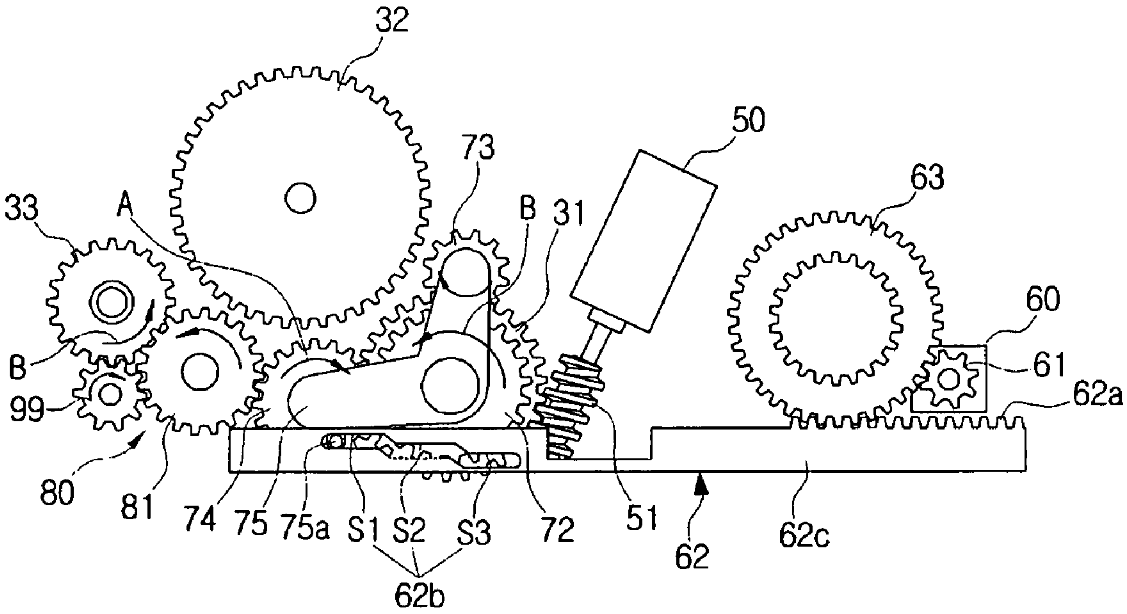
FIG. 6 is a side view illustrating the driving apparatus of FIG. 2 when a recording medium is discharged after being printed.

When the rack member 62*c* is moved in the direction of an arrow R in FIG. 5 by the output gear 61 of the second driving source 60, the guide protrusion 75*a* of the swing lever 75 is guided along the guide slot 62*b* of the rack member 62*c*, and is positioned back on the upper step S1 of the guide slot 62*b*, as illustrated in FIG. 6. As a result, the swing lever 75 is swung in the direction of an arrow C in FIG. 5.

With such a swing operation of the swing lever 75 in the direction of the arrow C, the second swing gear 74 is engaged to the clutch unit 80, as illustrated in FIG. 6.

When the driving gear 31 is rotated in the direction of the arrow B by the first driving source 50, a driving force of the driving gear 31 is transmitted to the second driven gear 33 through the second swing gear 74 of the swing gear assembly 70 and the clutch unit 80 to rotate the second driven gear 33 in the direction of the arrow B. Meanwhile, the first swing gear 73 is separated from the driven gear 32, as illustrated in FIG. 6, so that the ink ribbon 20 is not transferred.

As a result, the pickup roller 11 is rotated in the direction of the arrow B, so that the recording medium P is discharged in the direction of the arrow F in FIG. 1 guided by the structure 17 through an upper surface of the pickup roller 11.

At this time, the second driving source 60 moves the thermal transfer head 15 in a direction of the arrow W in FIG. 1 to move the thermal transfer head 15 away from ink ribbon 20 and the recording medium P.

As described above, and according to the present general inventive concept, a driving apparatus is configured so that it has a simplified structure, thereby facilitating the miniaturization of the thermal transfer image forming device.

Further, according to the present general inventive concept, the driving apparatus and the thermal transfer image forming device having the same can more accurately and smoothly transmit a driving force, thereby enabling the thermal transfer image forming device to form an improved quality image.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A driving apparatus usable in an image forming apparatus, comprising:
- a driving gear bidirectionally rotatable by a driving source;
- at least two driven gears selectively driven by the driving gear;
- at least two swing gears connected to the driving gear to drive corresponding ones of the at least two driven gears;
- a swing lever pivotally disposed to support the at least two swing gears; and
- an adjusting unit to adjust a swing position of the swing lever,
- wherein the adjusting unit comprises:
- a rack member coupled to a side of the swing lever to linearly move and to swing the swing lever.

2. The driving apparatus of claim 1, wherein the rack member comprises a guide slot having a plurality of steps, each step having a different height with respect to a reference, and the swing lever comprises a guide protrusion projected from the side of the swing lever to be guided by the guide slot.

3. The driving apparatus of claim 2, wherein a number of the plurality of steps is one more than a number of the at least two driven gears.

4. The driving apparatus of claim 1, wherein the at least two driven gears are rotated only in one direction.

5. The driving apparatus of claim 1, further comprising:
- a clutch unit disposed between at least one of the at least two driven gears and at least one of the at least two swing gears to regulate the at least one of the at least two driven gears to rotate only in one direction.

6. The driving apparatus of claim 5, wherein the clutch unit comprises:
- an input gear bidirectionally rotatable by the at least one of the at least two swing gears;
- a first clutch part to transmit a driving force from the input gear and to change the rotating direction of the driving force to the at least one of the at least two driven gears; and
- a second clutch part to transmit the driving force from the input gear without changing the rotating direction to the at least one of the at least two driven gears.

7. The driving apparatus of claim 5, wherein:
- the at least two driven gears comprise first and second driven gears;
- the at least two swing gears comprise first and second swing gears; and
- the swing position of the swing lever adjusted by the adjusting unit comprises a first position to engage the second swing gear with the clutch unit, a second position wherein the first swing gear and the second swing gear are not engaged to the first driven gear and the clutch unit, respectively, and a third position to engage the first swing gear to the first driven gear.

8. The driving apparatus of claim 7, wherein the adjusting unit comprises a guide slot having first, second, and third steps corresponding to the respective first, second, and third positions.

9. The driving apparatus of claim 1, wherein:
- the at least two driven gears comprise first and second driven gears;
- the at least two swing gears comprise first and second swing gears; and
- the swing position of the swing lever adjusted by the adjusting unit comprises a first position to engage the second swing gear with the second driven gear, a second position wherein the first swing gear and the second swing gear are not engaged with the first driven gear and the second driven gear, respectively, and a third position to engage the first swing gear to the first driven gear.

10. The driving apparatus of claim 9, wherein the adjusting unit comprises a guide slot having first, second, and third steps corresponding to the respective first, second, and third positions.

11. The driving apparatus of claim 9, wherein a reciprocal linear movement of the adjusting unit moves the guide protrusion between the first, second, or third step to swing the swing lever between the first, second, and third position, respectively.

12. An image forming apparatus, comprising:
- a supplying roller and a winding roller on which an ink ribbon is wound;
- a conveying roller to convey a recording medium;
- a pickup roller to pick up the recording medium;
- a thermal transfer head to thermally transfer dyes on the ink ribbon onto the recording medium; and
- a driving apparatus comprising:
  - a driving gear bidirectionally rotatable and connected to the conveying roller,
  - a first driven gear connected to the winding roller,
  - a second driven gear connected to the pickup roller,
  - a first swing gear and a second swing gear connected to the driving gear and to drive the first and second driven gears, respectively,
  - a swing lever to support the first and the second swing gears, and
  - an adjusting unit to adjust a swing position of the swing lever, wherein the adjusting unit comprises:

a rack member coupled to a side of the swing lever to linearly move and to swing the swing lever.

13. The image forming apparatus of claim 12, wherein the rack member comprises a guide slot having a plurality of steps, each step having a different height with respect to a reference, and the swing lever comprises a guide protrusion projected from the side of the swing lever to be guided by the guide slot.

14. The apparatus as claimed in claim 12, wherein the first and the second driven gears are rotated only in one direction.

15. The apparatus as claimed in claim 12, further comprising:

a clutch unit disposed between the second driven gear and the second swing gear to regulate the second driven gear to rotate only in one direction.

16. The apparatus as claimed in claim 15, wherein the clutch unit comprises:

an input gear bidirectionally rotatable by the second swing gear;

a first clutch part to transmit a driving force from the input gear and to change a direction of rotation; and a second clutch part to transmit the driving force from the input gear without changing the direction of rotation.

17. The apparatus as claimed in claim 12, wherein the rack member is disposed to linearly reciprocate by a driving source to drive the thermal transfer head.

18. The image forming apparatus of claim 12, further comprising:

a clutch unit disposed between the second driven gear and the second swing gear to regulate the second driven gear to rotate only in one direction.

19. The image forming apparatus of claim 18, wherein the swing position of the swing lever adjusted by the adjusting unit comprises a first position to engage the second swing gear with the clutch unit, a second position wherein the first swing gear and the second swing gear are not engaged to the first driven gear and the clutch unit, respectively, and a third position to engage the first swing gear to the first driven gear.

20. The image forming apparatus of claim 19, wherein the adjusting unit comprises a guide slot having first, second, and third steps corresponding to the respective first, second, and third positions.

21. A driving apparatus usable in an image forming apparatus, comprising:

a driving gear rotatable in a first and second direction by a driving source;

first and second driven gears selectively driven by the driving gear;

first and second swing gears connected to the driving gear to drive the first and second driven gears, respectively;

a swing lever pivotally disposed to support the first and second swing gears;

a clutch unit to regulate the rotation of the second swing gear in one of the first and second direction such that the second driven gear rotates in only one of the first and second direction; and an adjusting unit to adjust a swing position of the swing lever with respect to the driving gear, wherein the adjusting unit comprises:

a rack member coupled to a side of the swing lever to linearly move and to swing the swing lever.

22. The driving apparatus of claim 21, wherein the swing position of the swing lever adjusted by the adjusting unit comprises a first position to engage the second swing gear with the clutch unit, a second position wherein the first swing gear and the second swing gear are not engaged to the first driven gear and the clutch unit, respectively, and a third position to engage the first swing gear to the first driven gear.

23. The driving apparatus of claim 22, wherein the adjusting unit comprises a guide slot having first, second, and third steps corresponding to the respective first, second, and third positions.

* * * * *